April 25, 1967 R. G. CARLETON 3,316,539
COMPUTER DATA READ-IN CONTROL SYSTEM
Filed Feb. 6, 1964
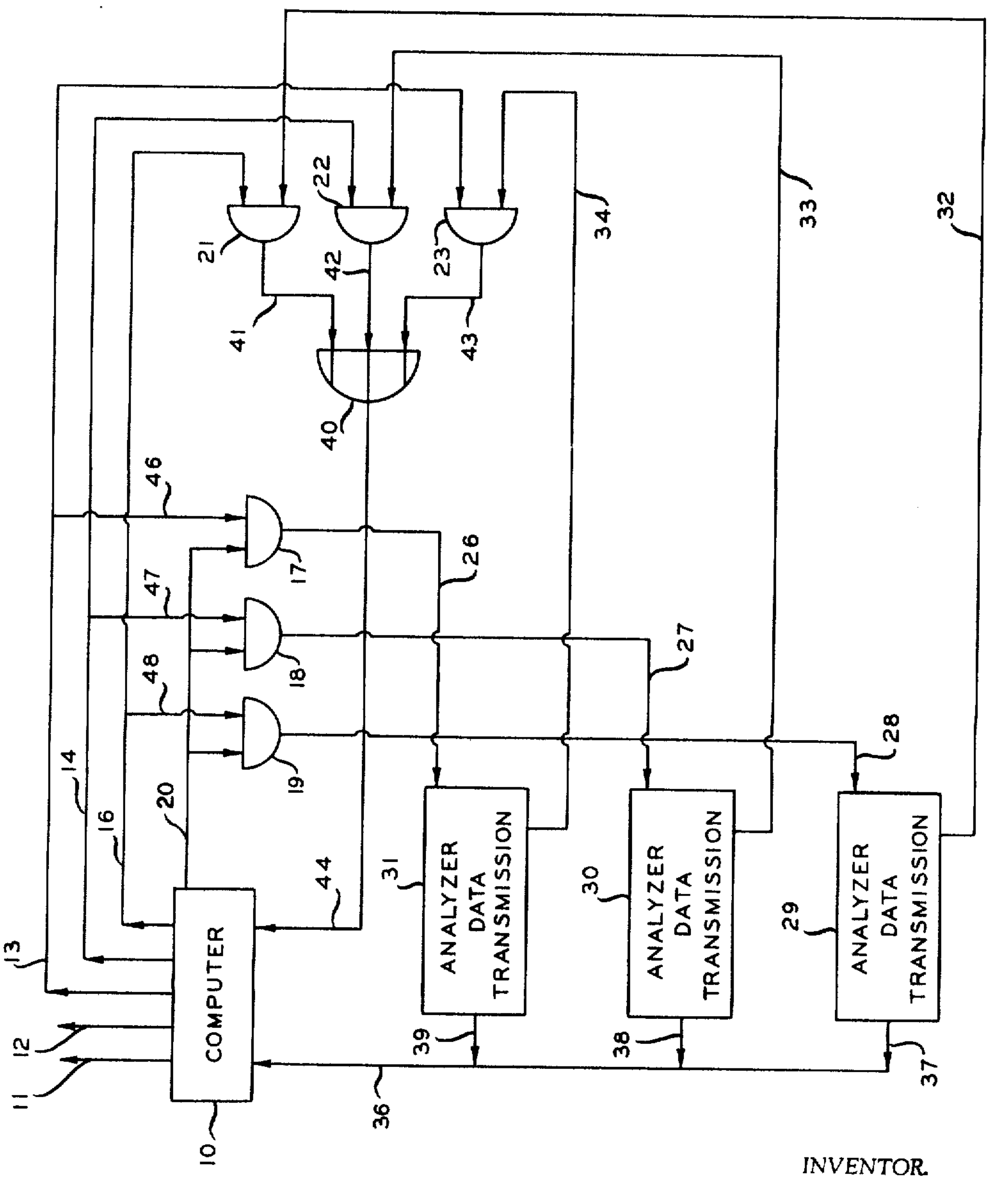
INVENTOR.
R. G. CARLETON
BY Young & Quigg
ATTORNEYS 3,316,539
Patented Apr. 25, 1967

3,316,539

COMPUTER DATA READ-IN CONTROL SYSTEM

Robert G. Carleton, Saxonville, Mass., assignor to Phillips Petroleum Company, a corporation of Delaware Filed Feb. 6, 1964, Ser. No. 342,941
6 Claims. (Cl. 340—172.5)

This invention relates to a method and apparatus for the transmission of data to a computer. In another aspect, this invention relates to a method and apparatus for controlling the transmission of data from multiple data transmitters employing limited computer sense channels.

When a computer is employed to control a process, process data are transmitted to the computer through input channels in a form compatible with the computer input requirements. The computer performs specific programmed functions utilizing the received data and transmits signals through output channels representative of the results of the computer functions.

Process data such as pressures, temperatures, and rates of flow, are constantly available. When a digital computer, for example, is employed, such process data can be scanned, zero suppressed, amplified, converted to digital form and sequenced into the computer input register according to a predetermined and established computer program. Other process data, such as process stream compositions as determined by chromatographic analyzers, are not constantly available because the results of the analysis are only available periodically or intermittently. Therefore, it becomes necessary that a means be provided for transmitting the analysis data, when available, to the computer.

Conventional computer systems utilize an input channel as a sense channel for the receipt of a signal indicating that the intermittently-available process data from a particular source is ready to be transferred to the computer. Responsive to this sense signal, transmitted through the sense channel, the computer input data program is adjusted and the intermittently-available process data is sequenced through the computer data input channel into the computer. It is necessary that a sense channel be provided for each intermittent data source. As the number of computer input channels that can be employed as sense channels is limited (normally ranging from one to three), the number of intermittent sources of data that can be utilized by the computer is limited.

Responsive to a signal received via the sense channel, the computer transmits a signal via a read channel to the data source, communicating to the data source the information that the computer is ready to receive the data. Heretofore, it has been necessary to provide a read channel and a sense channel for each intermittent data source.

Accordingly, an object of my invention is to provide an improved data computer data read-in control system.

Another object of my invention is to provide a computer data read-in control system wherein a single sense channel is employed to receive a signal from each of multiple intermittent data sources.

Another object of my invention is to provide a computer data read-in system wherein a single read channel is employed to transmit a signal to each of multiple intermittent sources.

Other objects, advantages and features of my invention will be readily apparent to those skilled in the art from the following description, the drawing and the appended claims.

I have by my invention provided a computer data read-in control system wherein (1) a single sense channel is employed to receive a signal from each of multiple intermittent data sources resulting from the combination of a data availability (ready) signal and an interrogation signal generated by the computer; and (2) a single read channel is employed to transmit a read signal from the computer to each of multiple intermittent data sources, said read signal being combined with an interrogation signal generated by the computer.

The invention is applicable to computers generally which are well known and are commercially available. The invention is applicable to computers generally capable of receiving programmed data signals, performing specific functions responsive thereto, and transmitting signals responsive to the programmed computer functions. The invention is particularly applicable to a digital computer such as the Autonetics Recomp II, general purpose, medium size and speed, transistorized digital computer manufactured by Autonetics Division, North American Aviation, Inc., Anaheim, Calif. A typical computer construction, the circuits involved, and the phenomena of operation are described in British Patent No. 749,836, published June 6, 1956, to Remington Rand, Inc., on what is known as the "Univac." Other circuits which can be employed in the digital computations are described in Engineering Research Associates "High Speed Computing Devices," McGraw-Hill, New York (1950), particularly in Chapter 13 thereof.

The drawing is a schematic representation of one embodiment of the invention.

Referring to the drawing, computer 10 transmits electrical output signals in a programmed sequence via channels or conduit means 11, 12, 13, 14 and 16. As illustrated by the drawing, data is transmitted electrically to computer 10 via channel means 36. When computer 10 is a digital computer, for example, the data is broken down into groups of digital bits. Each group of bits is of a size than can be channeled through the digital computer into the computer memory.

The programmed output signals passed from computer 10 via channels 13, 14 and 16 are interrogation signals and are employed to determine the availability of chromatographic analysis data for transfer to computer 10. When employing a digital computer, the interrogation signals can be conventional nixie display signals. The signals are passed via channels 13, 14 and 16 to AND gates 23, 22 and 21, respectively. Suitable AND gates are manufactured as DG3 Diode Gate Modules by Packard Bell Computer Corporation, Los Angeles 25, California, and illustrated in Catalog SP-120. The AND gates 23, 22 and 21 transmit an electrical signal upon receipt of an interrogation signal as described and a second electrical signal hereinafter described. The interrogation signals are also transmitted via channels 13, 14 and 16 and channels 46, 47 and 48, respectively, to conventional AND gates 17, 18 and 19, respectively.

As illustrated in the drawing, three analyzers are employed to obtain computer data intermittently and the data is transmitted from analyzer data transmission zones 29, 30 and 31 to computer 10 via channel means 36 and channel means 37, 38 and 39, respectively. For a discussion of the operation of suitable analyzer data transmission zones, reference is made to copending application Ser. No. 187,277, filed Apr. 13, 1962, by M. C. Burk and H. M. Neer.

Each of analyzer data transmission zones 29, 30 and 31 transmit electrical ready signals via channel means 32, 33 and 34, respectively, to AND gates 21, 22 and 23, respectively. When each of the said analyzer data transmission zones is ready to transmit data to computer 10, each of these ready signals is combined with a signal transmitted from computer 10 to gates 21, 22 and 23 in the previously described manner. Each of gates 21, 22 and 23 upon simultaneously receiving an electrical signal from computer 10 and from an analyzer data transmission zone, transmits an electrical signal via channel means 41, 42 or 43, respectively, to an OR gate 40. A suitable OR gate is manufactured as DG103 Diode Gate Module by Packard Bell Computer Corporation, Los Angeles, 25, California, and illustrated also in Catalog SP–120. OR gate 40 operates as an isolation zone and transmits only one electrical sense signal at a time via channel means 44 to computer 10 responsive to signals received via channel means 41, 42 or 43. This sense signal transmitted to computer 10 discloses to computer 10 that data is ready to be transferred from analyzer data transmission zone 29, 30 or 31. Although three data transmission zones are herein illustrated, it is within the scope of this invention to employ less than three or more than three data transmission zones with a single sense channel means 44. It thus can readily be seen that by the invention a single sense channel can be employed to transmit to computer 10 signals indicating the readiness of multiple data transmission zones to transmit data to a computer. The invention is particularly applicable wherein the data to be transmitted is only intermittently or periodically available for transfer to the computer.

Computer 10 transmits an electrical read signal via channel means 20 to the second control zone containing AND gates 17, 18 and 19. Each of AND gates 17, 18 and 19 transmits a signal responsive to the simultaneous receipt of a read signal and an interrogation signal received via channel means 46, 47 or 48, respectively, through channel means 26, 27 and 28, respectively. AND gates 17, 18 and 19 transmit signals to analyzer data transmission zones 31, 30 and 29, respectively. The signals transmitted to analyzer data transmission zones 29, 30 and 31 indicate to the said transmission zones that computer 10 is ready to receive data from the said data transmission zones. Upon signal, data is transmitted from analyzer data transmission zones 29, 30 and 31 to computer 10 via channel means 37, 38 or 39, and 36 in the previously described manner.

By my invention, a single read channel has been employed to transmit a read signal to multiple data transmission zones, thereby providing for more efficient utilization of the computer output channels in reducing to a minimum the channels required to transmit read signals.

As will be evident to those skilled in the art, various modifications of this invention can be made, or followed, in the light of the foregoing disclosure, without departing from the spirit or scope thereof.

I claim:

1. Apparatus comprising a computing means, a gate means, multiple gates within said gate means, means for passing multiple interrogation signals in sequence from said computing means to said gate means, each of said interrogation signals passed to a separate gate within said gate means, multiple data transmission means, means for passing a ready signal from each of said multiple data transmission means to a separate gate within said gate means, a sense channel means communicating between said gate means and said computing means, means for passing a sense signal from each of said multiple gates in said gate means through said sense channel to said computing means upon the simultaneous receiving of an interrogation signal and a ready signal by each of said gates, and means responsive to said computing means to actuate said multiple data transmission means.

2. The apparatus of claim 1 to include means for transmitting data from said multiple data transmission means to said computing means.

3. Apparatus comprising a computing means, a first gate means, a second gate means, multiple gates within each of said gate means, means for passing multiple interrogation signals in sequence from said computing means to said first gate means, each of said interrogation signals passed to a separate gate within said first gate means, means for passing said multiple interrogation signals from said computing means to said second gate means, each of said interrogation signals passed to a separate gate within said second gate means, multiple data transmission means, means for passing a signal from each of said data transmission means to a separate gate within said second gate means, a sense channel means communicating between said second gate means and said computing means, means for passing a sense signal from each of said multiple gates in said second gate means through said sense channel to said computing means upon the simultaneous receiving of an interrogation signal and a ready signal by each of said gates within said second gate means, a single read channel communicating between said computing means and said first gate means, means for passing a read signal through said read channel to each of said gates within said first gate means, and means for passing a signal from each of said gates within said first gate means to a separate data transmission means of said multiple data transmission means upon the simultaneous receiving of an interrogation signal and a read signal by each of said gates within said first gate means.

4. The apparatus of claim 3 wherein said means for passing a sense signal includes a means for isolating each of the signals passed from said gates within said second gate means to said computing means.

5. The apparatus of claim 4 to include means for transmitting data from said multiple data transmission means to said computing means.

6. The apparatus of claim 4 wherein each of the gates within said second gate means comprises an AND circuit and said means for isolating comprises an OR circuit.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 340—172.5 |
| 3,099,818 | 7/1963 | Murray | 340—172.5 |
| 3,181,121 | 4/1965 | Losch et al. | 340—172.5 X |
| 3,208,048 | 9/1965 | Kilburn et al. | 340—172.5 |

ROBERT C. BAILEY, *Primary Examiner.*

P. J. HENON, *Assistant Examiner.*